United States Patent [19]

Freermann

[11] 4,427,855
[45] Jan. 24, 1984

[54] PILE-GAP SENSOR, ESPECIALLY FOR DEEP-PILE CARPET

[75] Inventor: Johannes Freermann, Ochtrup, Fed. Rep. of Germany

[73] Assignee: Carl Schmale KG, Ochtrup, Fed. Rep. of Germany

[21] Appl. No.: 358,812

[22] Filed: Mar. 16, 1982

[30] Foreign Application Priority Data

Mar. 28, 1981 [DE] Fed. Rep. of Germany ....... 3112320

[51] Int. Cl.³ .................... B65H 25/14; G01B 5/06
[52] U.S. Cl. ................................................ 200/61.13
[58] Field of Search .................. 200/61.13–61.18, 200/61.41, 61.42, 153 T

[56] References Cited

U.S. PATENT DOCUMENTS

| 2,517,984 | 8/1950 | Cunningham | 200/61.41 X |
| 2,736,495 | 2/1956 | Calou | 200/61.41 X |
| 3,027,075 | 3/1962 | Howdle et al. | 200/61.41 |
| 3,044,052 | 7/1962 | Marsh | 200/61.18 |
| 3,748,414 | 7/1973 | Holm | 200/61.14 X |

*Primary Examiner*—J. R. Scott
*Attorney, Agent, or Firm*—Karl F. Ross; Herbert Dubno

[57] ABSTRACT

A pile-gap detector has an elongated plate adapted to ride upon the pile of a carpet web displaced past the detector. A sensor is movable in a window of this plate and drops into the pile-free gap to operate a signal generator. The support from the signal generator, plate and sensor is floatingly mounted so that the device rides freely upon the pile.

11 Claims, 2 Drawing Figures

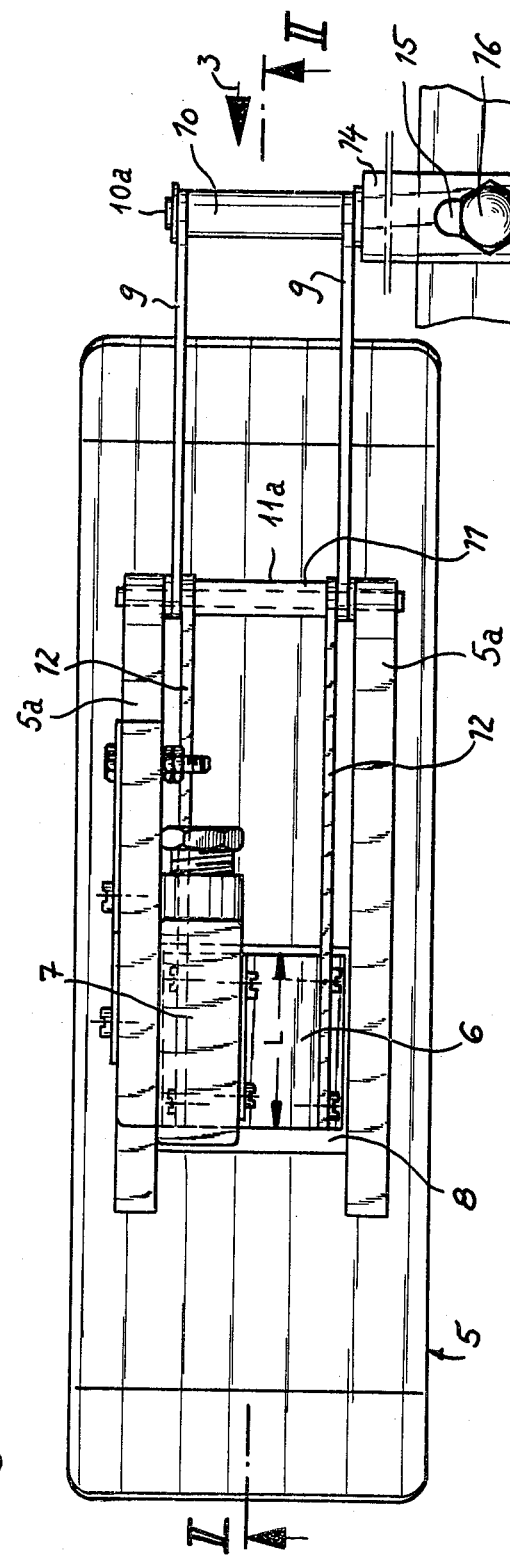
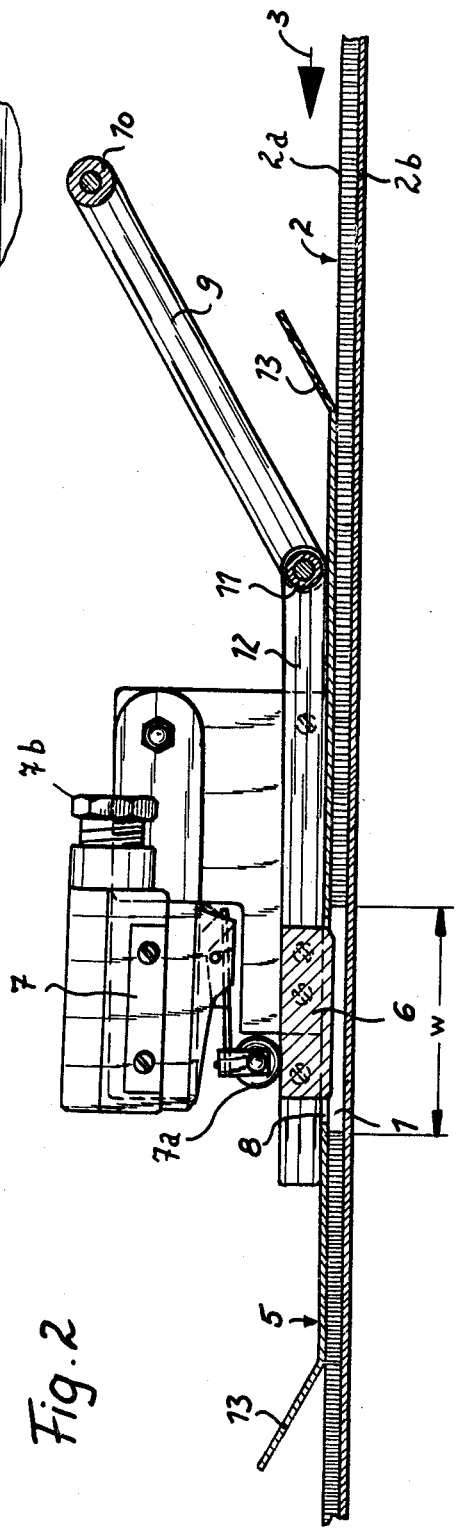

PILE-GAP SENSOR, ESPECIALLY FOR DEEP-PILE CARPET

FIELD OF THE INVENTION

My present invention relates to a pile-gap sensor for deep-pile carpeting and, more particularly, to a height-measuring device for the recurrent gaps between lengths of pile on a fabric web, especially carpeting in which the pile gaps are intended to represent zones at which the web is to be cut.

BACKGROUND OF THE INVENTION

In the production of carpeting and, especially, deep-pile carpet, the pile-carrying web is provided with transverse zones which are free from pile and are recurrent, the continuous web being severed or cut into lengths along these zones.

It is known to provide a pile-height detector which responds to the upper surface of the pile and detects changes in the height of the web indicative of the passage of a pile-free zone at which the height of the web corresponds to the thickness of the backing.

The device is provided with a signal generator responsive to the detection of the height difference between the top of the pile and the upper surface of the pile-free zone to initiate the cutting operation.

The web is transported past the detector along a transport path by any conventional conveying or displacing means.

In earlier devices, the detector was constituted by a member which dropped into the recess formed by the pile-free zone and could have a length up the length of the pile-free zone and a width slightly less than that of the pile-free zone.

In general, the cutting operation consisted of halting the displacement of the web and shifting a cutting head across the width thereof.

The detector was disposed above the transport path and generally adjusted by hand so as to lie above the tips of the pile, the sensor dropping into the pile-free zone when the latter reached the detector.

Various problems were encountered with this device not the least of which was the need for repositioning the device for various thicknesses of carpeting and pile heights.

OBJECT OF THE INVENTION

It is the principal object of the present invention to provide a simple device for detecting the pile-free zone, especially for deep-pile carpeting, whereby disadvantages of earlier devices for this purpose are obviated and, especially, readjustment or repositioning of the device for carpeting of different thickness or pile of different height is unnecessary.

SUMMARY OF THE INVENTION

These objects and others which will become apparent hereinafter are attained, in accordance with the present invention, by providing a device for the purposes described which comprises a support, a surface provided on this support and extending in the direction of displacement of the web over a distance greater than the maximum dimension of the sensor, for example, the width of the pile-free gap, whereby this surface rides upon the pile and is capable of bridging the gap, a sensor movably mounted on this support and relative to the surface so that it can drop into the pile-free gap while the surface is supported by the pile on opposite sides of this gap, the sensor having a dimension in the direction of movement of the web which can be up to the width of the gap, and a signal generator activated by relative movement of the sensor and the support for signaling the detection of the gap.

According to an important feature of this invention, both the support surface and the sensor are floatingly mounted above the web to allow the surface to rest upon the pile and hence the support and the other elements of the device to ride thereon.

If the device is biased somewhat downwardly, for example by its weight, therefore, it is automatically adjusted to the thickness of any carpet since the aforementioned surface will come to rest upon the pile and be supported thereby. Manual adjustment is therefore not required. Only the sensor itself need drop into the pile-free gap.

To provide effective support by the pile of the surface and the mechanism carried thereby, it is advantageous to make the length of this surface, which provides a reference plane for measuring the pile height, of a length which is a multiple of the maximum length of the sensor and hence a multiple of the width of the pile-free gap. Especially effective results are obtained when the total length of this comparator surface is about five times as long as the maximum length of the sensor which, of course, cannot exceed the width of the pile-free gap. The sensor is advantageously disposed at a location intermediate the length of the comparator or reference surface and is preferably displaceable in a window formed therein.

According to another feature of the invention, the transport means for the web includes a frame or like supporting structure to which the detector of the invention is articulated. Advantageously, this structure can have a pin upon which a rigid arm reaching to the support is swingably mounted. This arm or link can also be pivotally connected to the support.

This arm, if rigid, also serves to affix the floating support laterally, i.e. against movement in the horizontal or transverse direction.

The reference surface can have the configuration and structure of an elongated plate extending in the direction of displacement of the web and preferably with round corners and upturned ends.

The window in this plate is formed intermediate the upturned ends and spaced inwardly therefrom. The upturned ends form ramps permitting the reference surface to ride onto the pile easily and conveniently.

The sensor itself can be pivotally mounted upon the support and preferably can have its height adjustable thereto. It has been found to be advantageous moreover to pivotally connect the aforementioned arm to the support and to pivotally connect the sensor to the support at a common pivot axis, for example by a common pivot pin extending perpendicularly to the direction of displacement of the web.

BRIEF DESCRIPTION OF THE DRAWING

The above and other features and advantages of the present invention will become more apparent by the following description, reference being made to the accompanying drawing in which:

FIG. 1 is a plan view of a device according to the present invention; and

FIG. 2 is a section taken along the line II—II of FIG. 1.

SPECIFIC DESCRIPTION

In the drawing, a device for detecting the passage of a pile-free zone 1 of a web 2, for example a deep-pile carpet, is disposed along a transport path represented by the arrow 3 by any conventional transport means or conveyor means whose frame is represented at 4. The carpet web 2 has pile 2a extending upwardly from the backing 2b and is interrupted in the region of the zone 1.

When the pile-free zone is detected, the transport means is stopped in such manner as to center this zone in line with the cutting head and the cutting head is displaced across the web to cut a length of carpet from the continuous web.

The cutting device and conveyor, as well as the control means actuated by the detector, are conventional in the art and have not been illustrated or described in detail. The invention is also applicable to other systems, for example to systems in which the conveyor is stopped for the proper positioning of the web so that labels, buttons, studs or the like can be affixed at predetermined locations.

The reference plane is provided by an elongated plate 5 which has upturned ends 13 forming ramps allowing a support 5a carrying this plate to ride up upon the pile 2a, the plate 5 resting upon the pile and being of a length significantly greater than the width w of the pile gap 1. A sensor 6 is movably carried by the support and extends through a window 8 in the plate so that it can drop into the gap 1 (FIG. 2) as the gap moves past the detector while the plate 5 is supported on the pile. A signal generator, represented only generally at 7, is also carried by the support and responds to the downward movement of the sensor 6 relative to the plate 5 to signal the presence of the gap. This signal generator, not shown in detail because any conventional signal generating unit can be utilized for this purpose, can be a microswitch, inductive motion detector or the like.

The long sides of the plate 5 are oriented in the direction 3 of displacement of the web. The opening or window 8 is displaced at an intermediate location along the plate 5 preferably approximately midway along the length thereof and the sensor 6 can pass through this window with clearnace.

The length L of the sensor is less than the width w of the pile gap and a small fraction of the length of the plate 5.

For example, the length of the plate 5 is a multiple of the length L and of the greatest possible length of this sensor 6, such as the width w of the gap. The width of the plate 5 may also be several times greater than the width of the sensor 6 so that the plate 5 is supported effectively on top of the pile 2a and the drop of the sensor 6 into the gap can accurately signal the detection of the latter.

The plate 5, the support 5a and the sensor 6 are floatingly supported on the pile by pivotally connecting the support to the frame 4 of the transport device. To this end, a pair of rigid links 9, extending generally in the direction of displacement of the web, are held apart by a spacer 10 on a pivot pin 10a secured to the frame 4 and extending at right angles to the direction 3 of movement of the web. The pin 10a is mounted on a bracket 14 provided with a slot 15 receiving a bolt 16 to enable adjustment of the position of the detector in the transverse direction at right angles to the direction 3.

The lengths 9 are freely swingable also on a pin 11 which is mounted on the support 5a and are held apart by spacer sleeve 11a. The pivot pin 11 is parallel to the pivot pin 10a.

The pivot pin 11 also serves to swingably mount a pair of bars 12 to which the sensor 6 is affixed. These bars 12 extend substantially parallel to the direction of displacement 3 and carry the sensor 6 at their free ends to enable the sensor to swing upwardly and downwardly in the window 8.

It has been found to be advantageous to make the length of plate 5 substantially $2\frac{1}{2}$ times its width. Furthermore, the signal generator 7 can be, instead of as a microswitch whose roller 7a rides upon the sensor 6, an optical motion detector. Means for limiting the height of the sensor 6 relative to the plate 5 can also be provided in the form of a cam which can be displaced by a spindle rotated by the nut 7b.

It will be apparent that the height of the plate 5 automatically adjusts to the level of the pile surface for carpeting of various thickness and manual adjustment of the reference surface is not necessary.

I claim:

1. A pile gap detector, especially for a web displaced along a transport path in a transport direction, said detector comprising:

a support formed with a substantially planar reference surface having a dimension in said direction substantially in excess of the dimension of said gap in said direction and adapted to ride upon the pile of said web;

a sensor having a dimension in said direction equal at most to said dimension of said gap and movably mounted on said support so as to drop into said gap and thereby move relative to said surface in a direction generally transverse thereto;

means for floatingly mounting said support above said path whereby said surface rides freely on said web; and a signal generator on said support operatively connected to said sensor for signaling relative movement of said sensor on said surface.

2. A detector defined in claim 1 wherein said surface is an elongated plate with its longitudinal dimension extending in said direction, the length of said plate being a multiple of said dimension of said sensor.

3. The detector defined in claim 2 wherein the length of said plate is about five times greater than said dimension of said sensor.

4. The detector defined in claim 1 wherein the means for floatingly mounted said support includes a pivot affixed along said path and having a pivot axis transverse to said direction of displacement of said web, and a rigid link pivotal about said axis and connected to said support.

5. The detector defined in claim 4, further comprising another pivot perpendicular to said direction of displacement and connecting said link to said support.

6. The detector defined in claim 5 wherein said surface is an elongated platform with a window, said sensor being movable in said window.

7. The detector defined in claim 6, further comprising a rigid bar swingably mounting said sensor on said other pivot.

8. The detector defined in claim 7 wherein said plate is formed with upwardly turned ends defining ramps.

9. The detector defined in claim 1 wherein said sensor is pivotally mounted on said support.

10. The detector defined in claim 9 wherein said means for floatingly mounting said support includes a link pivotally connected to said support at the same pivot axis as said sensor is mounted thereon.

11. A pile gap detector, especially for a web displaced along a transport path in a transport direction, said detector comprising:
- a support formed with a substantially planar reference surface having a dimension in said direction substantially in excess of the dimension of said gap in said direction and adapted to ride upon the pile of said web;
- a sensor having a dimension in said direction equal at most to said dimension of said gap and movably mounted on said support so as to drop into said gap and thereby move relative to said surface in a direction generally transverse thereto;
- means for floatingly mounting said support above said path whereby said surface rides freely on said web; and
- a signal generator on said support operatively connected to said sensor for signaling relative movement of said sensor on said surface, said surface being an elongated plate with its longitudinal dimension extending in said direction, the length of said plate being about five times greater than said dimension of said sensor, said surface being an elongated platform with a window, said sensor being movable in said window.

* * * * *